(12) United States Patent
Park

(10) Patent No.: US 7,079,841 B2
(45) Date of Patent: Jul. 18, 2006

(54) APPARATUS FOR PERFORMING A HANDOVER BETWEEN DIFFERENT MOBILE COMMUNICATION SYSTEMS AND METHOD FOR CONTROLLING THE SAME

(75) Inventor: Ji-Hoon Park, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 142 days.

(21) Appl. No.: 10/726,836

(22) Filed: Dec. 3, 2003

(65) Prior Publication Data

US 2004/0137903 A1 Jul. 15, 2004

(30) Foreign Application Priority Data

Dec. 5, 2002 (KR) ............... 10-2002-0076970

(51) Int. Cl.
*H04Q 7/20* (2006.01)
(52) U.S. Cl. .................... 455/436; 455/444
(58) Field of Classification Search ........... 455/436, 455/426, 440–444, 437, 553.1, 426.1, 552.1, 455/550.1, 551, 515, 439; 370/331, 342, 370/366, 333, 466, 332; 375/358
See application file for complete search history.

(56) References Cited

U.S. PATENT DOCUMENTS

| | | | |
|---|---|---|---|
| 5,697,055 A * | 12/1997 | Gilhousen et al. ........ 455/436 |
| 5,917,811 A * | 6/1999 | Weaver et al. ........... 370/332 |
| 5,937,019 A * | 8/1999 | Padovani ................. 375/358 |
| 5,940,761 A * | 8/1999 | Tiedemann et al. ...... 455/437 |
| 6,243,582 B1 * | 6/2001 | Lahtinen ................. 455/436 |
| 6,246,673 B1 * | 6/2001 | Tiedemann et al. ...... 370/333 |
| 6,321,087 B1 * | 11/2001 | Do ........................ 455/436 |
| 6,438,117 B1 * | 8/2002 | Grilli et al. ............. 370/331 |
| 6,493,332 B1 * | 12/2002 | Hirade .................... 370/342 |
| 6,594,242 B1 * | 7/2003 | Kransmo ................. 370/331 |
| 6,704,581 B1 * | 3/2004 | Park et al. ............. 455/553.1 |
| 6,778,832 B1 * | 8/2004 | Chow et al. ............. 455/444 |
| 6,836,471 B1 * | 12/2004 | Holma et al. ........... 370/331 |
| 6,879,600 B1 * | 4/2005 | Jones et al. ............. 370/466 |
| 2002/0147008 A1 * | 10/2002 | Kallio .................... 455/426 |
| 2004/0266435 A1 * | 12/2004 | de Jong et al. ......... 455/436 |

* cited by examiner

*Primary Examiner*—Eliseo Ramos-Feliciano
*Assistant Examiner*—Michael T. Vu
(74) *Attorney, Agent, or Firm*—Dilworth & Barrese LLP

(57) ABSTRACT

An apparatus for performing a handover between different mobile communication systems and a method for controlling the same. The apparatus performs a handover between first and second mobile communication networks according to the movement of a user who uses a mobile terminal for supporting both first and second mobile communication services to establish a call connection state. A mobile communication network includes at least two mobile communication systems adapting mutually independent communication methods and a mobile terminal using the two mobile communication systems.

13 Claims, 3 Drawing Sheets

APPARATUS FOR PERFORMING A HANDOVER BETWEEN DIFFERENT MOBILE COMMUNICATION SYSTEMS AND METHOD FOR CONTROLLING THE SAME

PRIORITY

This application claims priority to an application entitled "Hand-Over Apparatus and Method Between Mobile Communication Systems", filed in the Korean Intellectual Property Office on Dec. 5, 2002 and assigned Serial No. 2002-76970, the contents of which are hereby incorporated by reference.

BACKGROUND OF THE INVENTION

1. Field of the Invention

The present invention relates to an apparatus and method for performing a handover in a mobile communication system, and more particularly to an apparatus and method for performing a handover between first and second mobile communication networks according to a movement of a user who uses a mobile communication terminal for supporting both first and second mobile communication services to establish a call connection state.

2. Description of the Related Art

Mobile communication service systems may be classified into synchronous mobile communication systems and asynchronous mobile communication systems. Typically, asynchronous mobile communication systems are classified into WCDMA (Wideband Code Division Multiple Access) systems and UMTS (Universal Mobile Telecommunications System) which has been adopted as European Standard (ES). Synchronous mobile communication systems are adapted to accurately establish synchronization with all base stations because they employ GPS satellites. For example, two kinds of synchronous mobile communication systems, are second-generation CDMA systems such as IS-95 or J-STD008, which are serviced in Korea and the USA, and CDMA2000, which has been adopted as American National Standard.

WCDMA asynchronous mobile communication service standardization is in progress in the 3GPP (3rd Generation Partnership Project). WCDMA is based on the European Standard GSM. CDMA-1X synchronous mobile communication service standardization is in progress in the 3GPP2. CDMA-1x is an upgrade from IS-95B. Therefore, compatibility between WCDMA and GSM is being fully investigated in the 3GPP, and compatibility between the CDMA-1X and IS-95A/B has already been implemented.

Though construction of the WCDMA network is progressing with a large area of interface with CDMA-1X, it remains impossible to perform a handover when a call connection state moves from the WCDMA network to the CDMA-1X network because there is no communication standard in common between WCDMA and CDMA-1X. In other words, it is impossible to perform a handover because procedures for interworking between independent communication systems (i.e., a synchronous system and an asynchronous system) are not defined.

A mobile communication terminal connected to a synchronous communication network and serviced thereby should continuously receive a synchronous mobile communication service. Similarly, a mobile communication terminal connected to an asynchronous communication network and serviced thereby should continuously receive an asynchronous mobile communication service.

In conclusion, it is necessary for a mobile communication terminal to perform handovers from a synchronous network to an asynchronous network or from an asynchronous network to a synchronous network according to movement of the terminal, but prior art mobile communication terminals have no apparatus or method for performing such handovers.

Therefore, when a user in a call connection state via an asynchronous mobile communication network moves to an area of a synchronous mobile communication network, the call connection state is interrupted. For example, if an asynchronous mobile communication network is installed in a narrow area such as a city, and a user in a call connection state within the city moves to areas without an asynchronous mobile communication network, the call connection state is interrupted.

In light of the development of asynchronous mobile communication service, it is anticipated that such a service will be initially provided only in a prescribed area, and will then be provided throughout a whole country. Considering this fact, a method of enabling handovers between different mobile communication networks is needed.

SUMMARY OF THE INVENTION

Therefore, the present invention has been made in view of the above problems. It is an object of the present invention to provide an apparatus and method for performing a handover between first and second mobile communication networks according to the movement of a user who uses a mobile communication terminal for supporting both first and second mobile communication services to establish a call connection state.

It is another object of the present invention to provide an apparatus and method for performing a handover between synchronous and asynchronous mobile communication networks according to the movement of a user who uses a mobile communication terminal for supporting both synchronous and asynchronous mobile communication services.

In accordance with the present invention, the above and other objects can be accomplished by the provision of an apparatus for performing a handover between at least two mobile communication systems in a mobile communication network including the two mobile communication systems adapting mutually independent communication methods and a mobile communication terminal using the mobile communication systems, the apparatus including: a first mobile communication system for transmitting a first handover notification message to the mobile communication terminal and generating a second handover notification message upon receiving a handover preparation message from the mobile communication terminal; a second mobile communication system for transmitting a page message to the mobile communication terminal upon receiving the second handover notification message from the first mobile communication system, transmitting a channel assignment message upon receiving a prescribed page response message, and forming a call path; and a mobile communication terminal having first and second communication modules respectively communicating with the first and second mobile communication systems, wherein the first communication module generates a drive command for the second communication module upon receiving the first handover notification message from the first mobile communication system, and transmits the handover preparation message to the first mobile communication system upon receiving a prescribed drive-response signal, and the second communication module transmits the drive-response signal to the first communication module upon receiving the drive command from the first communication module, transmits the page response message upon receiving the page message from the second mobile communication system, and enters a call connection state upon receiving the channel assignment message from the second mobile communication system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
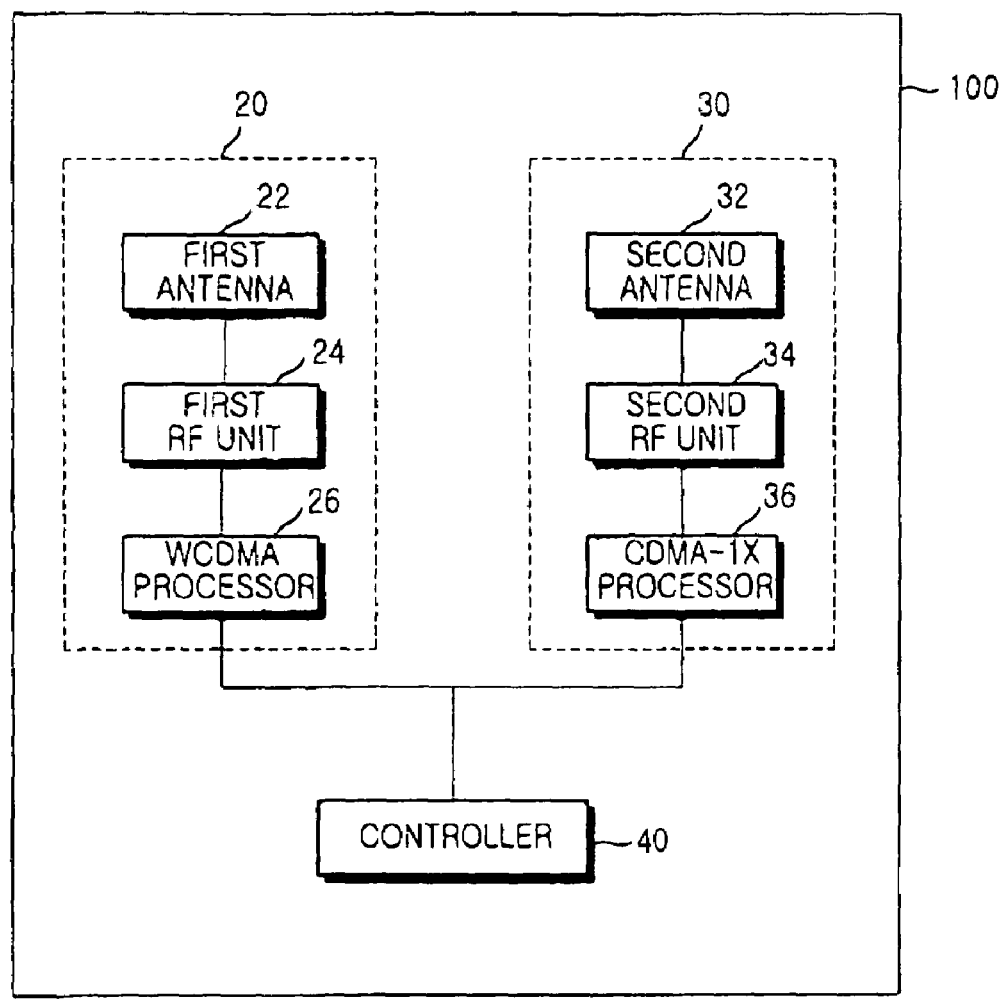
FIG. 1 is a block diagram of a multimode multiband mobile communication terminal in accordance with a preferred embodiment of the present invention.

Preferred embodiments of the present invention will be described in detail below with reference to the attached drawings. In the drawings, elements which are the same are denoted by the same reference numerals even though they are depicted in different drawings. In the following description, a detailed description of known functions and configurations incorporated herein will be omitted when it may make the subject matter of the present invention unclear.

A synchronous mobile communication service according to the present invention may be, for example, a CDMA service or a IS-95A/B service. An asynchronous mobile communication service according to the present invention may be, for example, a GSM service, a WCDMA service, or a PDC (Personal Digital Cellular) service (which is widely used in Japan). According to the present invention, it is possible to perform a handover from the CDMA or IS-95A/B service to the GSM, WCDMA or PDC service. Also according to the present invention, it is possible to perform a handover from the GSM, WCDMA or PDC service to the CDMA or IS-95A/B service. It is further possible according to the present invention to perform a handover between different asynchronous mobile communication services such as GSM and WCDMA services.

FIG. 1 is a view illustrating a block diagram of a multimode multiband mobile communication terminal in accordance with a preferred embodiment of the present invention.

A mobile communication terminal according to the present invention is a multimode and multiband mobile communication terminal (hereinafter referred to as a MMMB mobile communication terminal). To support first and second mobile communication services, the MMMB mobile communication terminal independently includes an antenna, an RF (Radio Frequency) unit, and a corresponding service processor for each mobile communication service.

The example MMMB mobile communication terminal shown in FIG. 1 implements the first mobile communication service with a WCDMA service (which is an asynchronous service), and implements the second mobile communication service with a CDMA-1X service (which is a synchronous service).

A WCDMA module 20 includes a first antenna 22 and a first RF unit 24 for transmitting or receiving RF signals for WCDMA service, and a WCDMA processor 26 for coding or decoding transmission or reception data according to a WCDMA method.

Likewise, a CDMA-1X module 30 includes a second antenna 32, a second RF unit 34, and a CDMA-1X processor 36. The WCDMA or CDMA-1X processor 26 or 36 may be implemented with a modem chip or a DSP within a chip. A controller 40 drives or stops the first and second mobile communication service modules 20 and 30, communicates between them, and controls operations of each service module.

The MMMB mobile communication terminal shown in FIG. 1 is operated as follows to perform a handover between different mobile communication networks.

In the case where the MMMB mobile communication terminal 100 is in an area for providing a first mobile communication service (i.e. WCDMA), a second antenna 32, a second RF unit 34 and a CDMA-1X processor 36 contained in the CDMA-1X module 30 for processing a second mobile communication service are not driven. Instead, a first antenna 22, a first RF unit 24, and a WCDMA processor 26 contained in the WCDMA module 20 are driven. Therefore, in this case, the MMMB mobile communication terminal 100 functions as a mobile communication terminal for the first mobile communication service.

In the case where the MMMB mobile communication terminal 100 is in an area for providing a second mobile communication service (i.e. CDMA-1X), the CDMA-1X module 30 is driven and the WCDMA module 20 is not driven, so that the MMMB mobile communication terminal 100 functions as a mobile communication terminal for the second mobile communication service.

Figure 2:
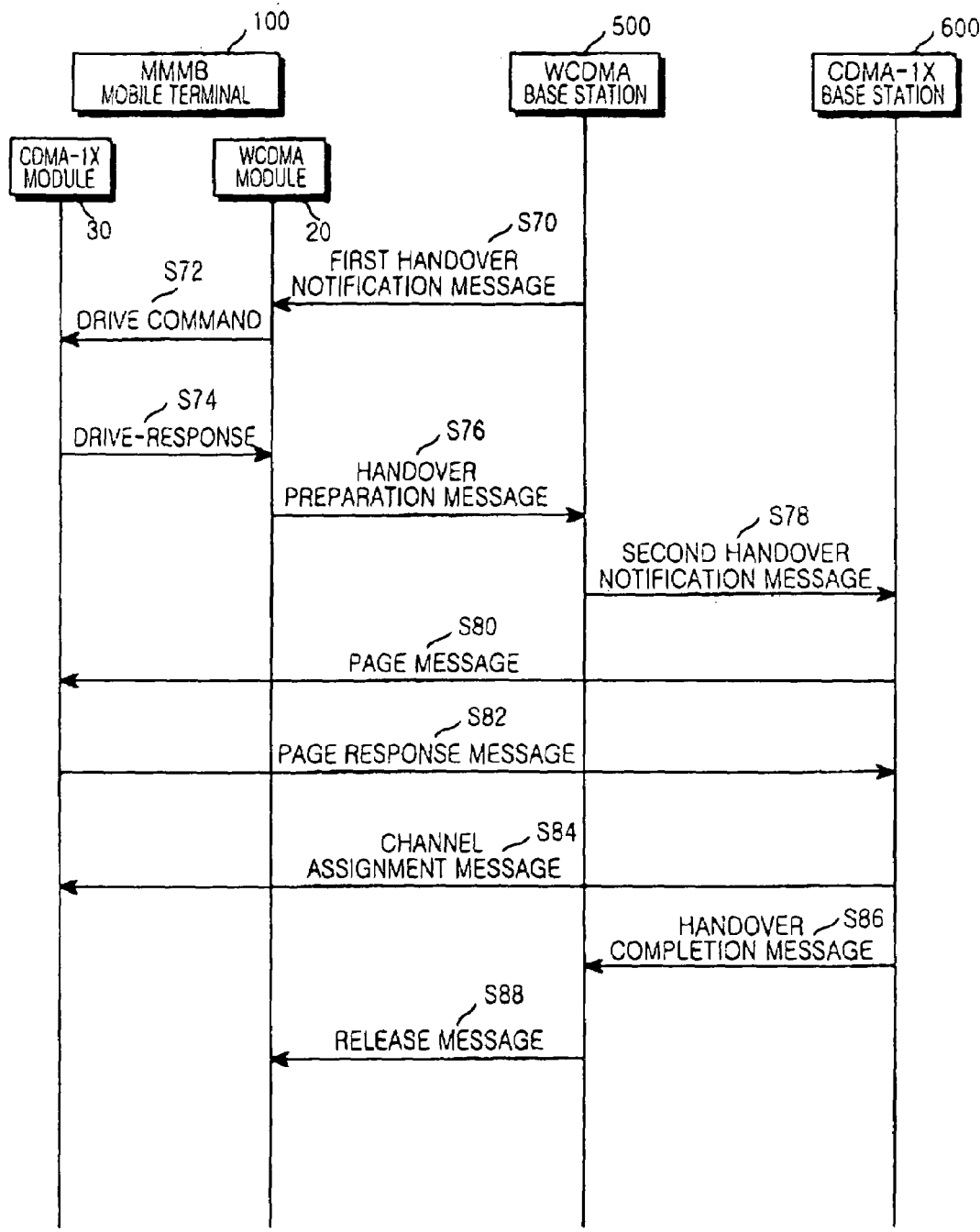
FIG. 2 illustrates a procedure for performing a handover between first and second mobile communication networks in accordance with a preferred embodiment of the present invention.

FIG. 2 illustrates a procedure for performing a handover between first and second mobile communication networks in accordance with a preferred embodiment of the present invention. The procedure shown in FIG. 2 is performed if a user in a call connection state over a first mobile communication network, such as a WCDMA mobile communication network (an asynchronous network), moves to an area for a second mobile communication network such as a CDMA-1X mobile communication network (a synchronous network).

Referring to FIG. 2, if a user establishes a call connection state over a WCDMA mobile communication network, the WCDMA module 20 of the MMMB mobile communication terminal 100 is driven and the CDMA-1X module 30 is not driven.

Thereafter, when the user moves to a position at which a handover should be performed, that is, an area covered by a CDMA-1X mobile communication service, a WCDMA base station 500 transmits a first handover notification message for indicating a handover between the prescribed first and second mobile communication networks to the WCDMA module 20 of the MMMB mobile communication terminal 100 at step S70.

The WCDMA module 20 of the MMMB mobile communication terminal 100 receives the first handover notification message, and then drives the CDMA-1X module 30 from an off-state to an on-state at step S72.

In this case, the MMMB mobile communication terminal 100 enters a call connection state on the WCDMA mobile communication network as if two independent phones are powered on, but the CDMA-1X mobile communication network enters an idle state. The WCDMA module 20 and the CDMA-1X module 30 of the MMMB mobile communication terminal 100 are temporarily both driven.

The CDMA-1X module 30 informs the WCDMA module 20 of its own on-state using a drive-response signal at step S74. The WCDMA module 20, recognizing the CDMA-1X module 30's on-state, wirelessly transmits a handover preparation message to the WCDMA base station 500 at step S76.

Three methods of recognizing the on-state of the CDMA-1X module 30 of the MMMB mobile communication terminal 100 by the CDMA-1X mobile communication network are described below with reference to FIG. 2.

First, if the WCDMA module 20 of the MMMB mobile communication terminal 100 informs the WCDMA base station 500 of an on-state of the CDMA-1X module 30, then the WCDMA base station 500 informs a CDMA-1X base station 600 of the same.

Second, if the CDMA-1X module 30 is driven, it attempts to perform a registration step at the CDMA-1X base station 600 so that the CDMA-1X base station 600 can recognize the CDMA-1X module 30's on-state.

Third, if a prescribed time elapses, the CDMA-1X base station 600 or the WCDMA base station 500 unilaterally decides that the CDMA-1X module 30 is driven.

A preferred embodiment of the present invention uses the first of the three recognition methods described above. Therefore, as shown in FIG. 2, the WCDMA base station 500 transmits a second handover notification message to the CDMA-1X base station 600 at step S78.

The CDMA-1X base station 600 receiving the second handover notification message transmits a page message to the CDMA-1X module 30 of the MMMB mobile communication terminal 100 at step S80 to perform a call termination procedure on a common call connection.

The CDMA-1X module 30, upon receiving the page message, transmits a page response message to the CDMA-1X base station 600 at step S82.

The CDMA-1X base station 600, upon receiving the page response message, transmits a channel assignment message to the CDMA-1X module 30 at step S84 to set up a call path.

As a result, a call connection state is handed over from the first mobile communication network to the second mobile communication network. The CDMA-1X base station 600 transmits a handover completion message to the WCDMA base station 500 at step S86 to inform the WCDMA base station 500 of a handover of call connection. The WCDMA base station 500 transmits a release message to the WCDMA module 20 of the MMMB mobile communication terminal 100 to release the call connection at step S88.

After performing the handover from the first mobile communication network to the second mobile communication network, a call connection is established on the CDMA-1X module 30.

Three methods for disconnecting a previous call path and establishing a new call path to accomplish a handover operation are described below.

First, a call path to the WCDMA module 20 may first be disconnected, and then a new call path to the CDMA-1X module 30 formed.

Second, a call path to the CDMA-1X module 30 may first be formed, and then a call path to the WCDMA module 20 disconnected.

Third, a call path to the CDMA-1X module 30 may be formed simultaneous to a call path to the WCDMA module 20 being disconnected.

The first method of disconnection described above has the advantage of creating a connection to either the first or the second mobile communication networks at a prescribed moment, but has the disadvantage that a call connection is interrupted if there is a handover failure. The second method will maintain a connection to the WCDMA module 20 if a call path is simultaneously connected to the WCDMA module 20 and the CDMA-1X module 30 at a prescribed moment and thus the CDMA-1X module 30 fails to perform a paging operation, thereby increasing the probability of a successful handover. The third method has advantages and disadvantages similar to those of the first method as described above.

Figure 3:
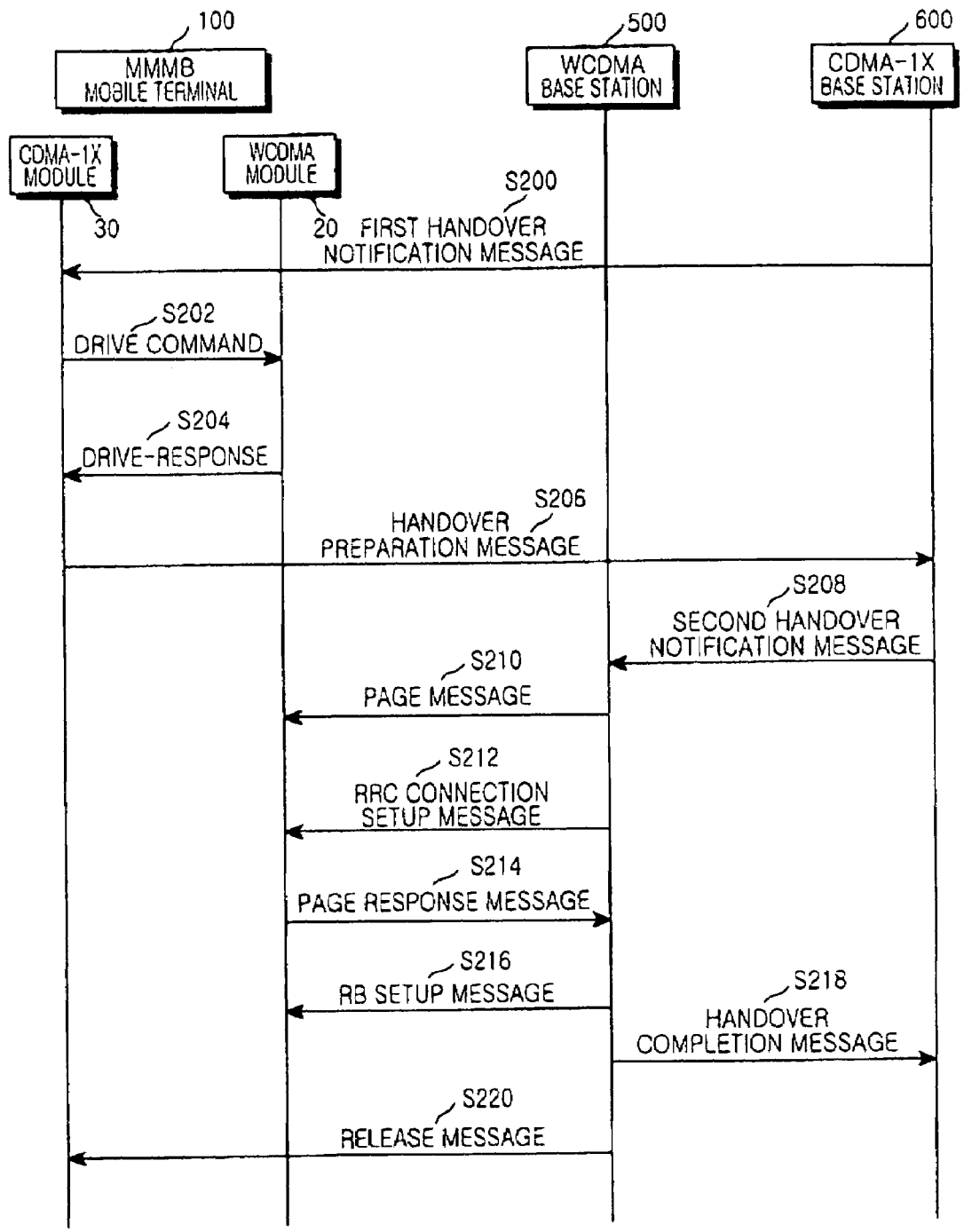
FIG. 3 illustrates a procedure for performing a handover between first and second mobile communication networks in accordance with another preferred embodiment of the present invention.

FIG. 3 illustrates a procedure for performing a handover between first and second mobile communication networks in accordance with another preferred embodiment of the present invention. The procedure shown in FIG. 3 is performed if a user in a call connection state over a second mobile communication network, such as a CDMA-1X mobile communication network (a synchronous network) moves to an area for the first mobile communication network, such as a WCDMA mobile communication network (an asynchronous network).

Referring to FIG. 3, if a user establishes a call connection state over a CDMA-1X mobile communication network, the CDMA-1X module 30 of the MMMB mobile communication terminal 100 is driven and the WCDMA module 20 is not driven.

Thereafter, when the user moves to a position at which a handover should be performed, that is, an area covered by a WCDMA mobile communication service, a CDMA-1X base station 600 transmits a first handover notification message for indicating a handover between the prescribed first and second mobile communication networks to the MMMB mobile communication terminal 100 at step S200.

If the CDMA-1X module 30 of the MMMB mobile communication terminal 100 receives the first handover notification message, then transmits a drive command to the WCDMA module 20 to drive the WCDMA module 20 from an off-state to an on-state at step S202. The WCDMA module 20, upon receiving the drive command, transmits a drive response signal to the CDMA-1X module 30 at step S204.

In this case, the MMMB mobile communication terminal 100 enters a call connection state on the CDMA-1X mobile communication network as if two independent phones are powered on, but the WCDMA mobile communication network enters an idle state. The CDMA-1X module 30 and the WCDMA module 20 of the MMMB mobile communication terminal 100 are temporarily both driven.

The CDMA-1X module 30 transmits a handover preparation message to the CDMA-1X base station 600 at step S206 to inform the CDMA-1X base station 600 of handover preparation completion of the CDMA-1X module 30.

Three methods of recognizing the on-state of the WCDMA module 20 of the MMMB mobile communication terminal 100 by the WCDMA mobile communication network are described below with reference to FIG. 3.

First, if the CDMA-1X module 30 of the MMMB mobile communication terminal 100 informs the CDMA-1X base station 600 of an on-state of the WCDMA module 20, then the CDMA-1X base station 600 informs the WCDMA base station 500 of the same.

Second, if the WCDMA module 20 is driven, it attempts to perform a registration step at the WCDMA base station 500 so that the WCDMA base station 500 can recognize the WCDMA module 20's on-state.

Third, if a prescribed time elapses, the WCDMA base station 500 or the CDMA-1X base station 600 unilaterally decides that the WCDMA module 20 is driven.

Another preferred embodiment of the present invention uses the first of the three recognition methods described above. Therefore, as shown in FIG. 3, the CDMA base station 600 transmits a second handover notification message to the WCDMA base station 500 at step S208.

The WCDMA base station 500 receiving the second handover notification message transmits a page message to the WCDMA module 20 of the MMMB mobile communication terminal 100 at step S210 to perform a call termination procedure on a common call connection.

The WCDMA module 20, upon receiving the page message, sets up a SRB (Signaling Radio Bearer) serving as a RRC (Radio Resource Control) connection setup message being one of channel assignment messages at step S212, and transmits a page response message to the WCDMA base station 500 at step S214.

The WCDMA base station 500, upon receiving the page response message, transmits a RBS (Radio Bearer Setup) message, serving as a channel assignment message, to the WCDMA module 20 at step S216 to set up a call path.

As a result, a call connection state is handed over from the CDMA-1X mobile communication network to the WCDMA mobile communication network. The WCDMA base station 500 transmits a handover completion message to the CDMA-1X base station 600 at step S218.

The CDMA-1X base station 600 transmits a release message to the CDMA-1X module 30 of the MMMB mobile communication terminal 100 to release the call connection at step S220.

After performing the handover from the CDMA-1X mobile communication network to the WCDMA mobile communication network, a call connection is established on the WCDMA module 20.

Three methods for disconnecting a previous call path and establishing a new call path to accomplish a handover operation are described below.

First, a call path to the CDMA-1X module 30 may first be disconnected, and then a new call path to the WCDMA module 20 formed.

Secondly, a call path to the WCDMA module 20 may first be formed, and then a call path to the CDMA-1X module 30 disconnected.

Thirdly, a call path to the WCDMA module 20 may be formed simultaneous to a call path to the CDMA-1X module 30 being disconnected.

The first method of disconnection described above has the advantage of creating a connection to either the second or the first mobile communication networks at a prescribed moment, but has the disadvantage that a call connection is interrupted if there is a handover failure. The second method will maintain a connection to the CDMA-1X module 30 if a call path is simultaneously connected to the WCDMA module 20 and the CDMA-1X module 30 at a prescribed moment and thus the WCDMA module 20 fails to perform a paging operation, thereby increasing the probability of a successful handover. The third method has advantages and disadvantages similar to those of the first method as described above.

As apparent from the above description, a handover apparatus and method according to the present invention effectively performs a handover between different mobile communication networks such that a call connection state is maintained even though a user moves from a current mobile communication service area to other mobile communication service area while in connection with a called party, thereby increasing the user's convenience.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for performing a handover between at least two mobile communication systems in a mobile communication network, the two mobile communication systems adapting mutually independent communication methods, and the network including a mobile communication terminal using the mobile communication systems, said apparatus comprising:

a first mobile communication system for transmitting a first handover notification message to the mobile communication terminal, and generating a second handover notification message upon receiving a handover preparation message from the mobile communication terminal;

a second mobile communication system for transmitting a page message to the mobile communication terminal upon receiving the second handover notification message from the first mobile communication system, transmitting a channel assignment message upon receiving a prescribed page response message, and forming a call path; and the mobile communication terminal having first and second communication modules respectively communicating with the first and second mobile communication systems, wherein the first communication module generates a drive command for the second communication module upon receiving the first handover notification message from the first mobile communication system, and transmits the handover preparation message to the first mobile communication system upon receiving a prescribed drive-response signal, and the second communication module transmits the drive-response signal to the first communication module upon receiving the drive command from the first communication module, transmits the page response message upon receiving the page message from the second mobile communication system, and enters a call connection state upon receiving the channel assignment message from the second mobile communication system.

2. The apparatus as set forth in claim 1, wherein the second mobile communication system informs the first mobile communication system of a call connection state with the mobile communication terminal after transmitting the channel assignment message, and then the first mobile communication system terminates a call connection state with the mobile communication terminal by transmitting a release message to the first communication module of the mobile communication terminal.

3. The apparatus as set forth in claim 1, wherein the first mobile communication system is disconnected from the first communication module of the mobile communication terminal before a call connection state between the second mobile communication system and the second communication module of the mobile communication terminal is established.

4. The apparatus as set forth in claim 1, wherein the first mobile communication system is disconnected from the first communication module of the mobile communication terminal after a call connection state between the second mobile communication system and the second communication module of the mobile communication terminal is established.

5. The apparatus as set forth in claim 1, wherein the first mobile communication system is disconnected from the first communication module of the mobile communication terminal at the same time that a call connection state between the second mobile communication system and the second communication module of the mobile communication terminal is established.

6. A method for performing a handover between first and second mobile communication networks in a multimode multiband (MMMB) mobile communication terminal including a first module connected to the first mobile communication network to control a call and a second module connected to the second mobile communication network to control a call, said method comprising the steps of:

a) upon receipt by the first module of a first handover notification message from the first mobile communication network, and upon receipt by the first module of a driven state of the second module by transmitting a drive command to the second module enabling the first module to transmit a handover preparation message to the first mobile communication network;
  b) enabling the first mobile communication network to transmit a second handover notification message to the second mobile communication network;
  c) if the second mobile communication network transmits a page message to the second module, enabling the second module, upon receiving the page message, to transmit a page response message to the second mobile communication network;
  d) enabling the second mobile communication network to transmit a channel assignment message to the second module; and
  e) performing a handover operation.

7. The method as set forth in claim 6, wherein step (e) first interrupts a call path between the first mobile communication network and the first module, and then forms a call path between the second mobile communication network and the second module.

8. The method as set forth in claim 6, wherein step (e) simultaneously interrupts a call path between the first mobile communication network and the first module and forms a call path between the second mobile communication network and the second module.

9. The method as set forth in claim 6, wherein step (e) first forms a call path between the first mobile communication network and the first module, and then interrupts a call path between the second mobile communication network and the second module.

10. The method as set forth in claim 6, wherein the first mobile communication network is an asynchronous mobile communication network (or system), the first module is an asynchronous mobile communication module, the second mobile communication network is a synchronous mobile communication network (or system), and the second module is a synchronous mobile communication module.

11. The method as set forth in claim 6, wherein the first mobile communication network is a synchronous mobile communication network (or system), the first module is a synchronous mobile communication module, the second mobile communication network is an asynchronous mobile communication network (or system), and the second module is an asynchronous mobile communication module.

12. The method as set forth in claim 10, wherein the asynchronous mobile communication system is a GSM, WCDMA, or PDC (Personal Digital Cellular) mobile communication system, and the synchronous mobile communication system is a CDMA or IS-95A/B mobile communication system.

13. The method as set forth in claim 11, wherein the asynchronous mobile communication system is a GSM, WCDMA, or PDC (Personal Digital Cellular) mobile communication system, and the synchronous mobile communication system is a CDMA or IS-95A/B mobile communication system.

* * * * *